(12) United States Patent
Smith et al.

(10) Patent No.: US 6,657,316 B1
(45) Date of Patent: Dec. 2, 2003

(54) WINDOW CONTROL APPARATUS

(75) Inventors: Nels R. Smith, Holland, MI (US);
Ruskin J. Lhamon, Holland, MI (US);
David J. Phillips, Holland, MI (US);
Rollin E. Nothwehr, Holland, MI (US);
James T. Wilkinson, Highlands Ranch, CO (US)

(73) Assignee: Johnson Contols Interiors Technology Corporation, Holland, MI (US)

( * ) Notice: Subject to any disclaimer, the term of this patent is extended or adjusted under 35 U.S.C. 154(b) by 0 days.

(21) Appl. No.: 09/468,631

(22) Filed: Dec. 21, 1999

Related U.S. Application Data (60) Provisional application No. 60/113,623, filed on Dec. 23, 1998.

(51) Int. Cl.[7] .................................................. B60J 7/57
(52) U.S. Cl. ...................................... 307/10.1; 340/438
(58) Field of Search ........................... 200/5 R; 307/9.1, 307/10.1; 340/438, 815.58, 815.65; 318/264–267, 286, 466–469; 49/26–28; 160/1; 701/49

(56) References Cited

U.S. PATENT DOCUMENTS

| | | | | | |
|---|---|---|---|---|---|
| 4,556,835 A | * | 12/1985 | Vogel et al. | ................. | 318/663 |
| 4,795,862 A | * | 1/1989 | Linden | ........................ | 200/5 R |
| 4,809,180 A | * | 2/1989 | Saitoh | ......................... | 318/466 |
| 4,931,714 A | * | 6/1990 | Yamamoto | .................. | 318/663 |
| 4,940,926 A | * | 7/1990 | Periou | ........................ | 318/603 |
| 5,291,103 A | * | 3/1994 | Ahmed et al. | .............. | 318/264 |
| 5,453,731 A | * | 9/1995 | Beyer | ......................... | 340/438 |
| 5,760,554 A | * | 6/1998 | Bustamante | ................ | 318/280 |
| 5,805,402 A | * | 9/1998 | Maue et al. | ............... | 361/93.1 |
| 5,808,374 A | * | 9/1998 | Miller et al. | ............... | 307/10.1 |
| 5,821,483 A | * | 10/1998 | Yamaguchi et al. | ........ | 200/5 R |
| 5,824,981 A | * | 10/1998 | Suzuki | .................... | 200/302.1 |
| 5,912,537 A | * | 6/1999 | Yang | .......................... | 318/663 |
| 6,064,932 A | * | 5/2000 | Francois | ...................... | 701/49 |
| 6,198,175 B1 | * | 3/2001 | Kalb et al. | ................. | 307/10.1 |

FOREIGN PATENT DOCUMENTS

| | | | | |
|---|---|---|---|---|
| DE | 33 24 107 | | 3/1984 | |
| DE | 41 32 499 | | 4/1993 | |
| EP | 0 352 920 | | 1/1990 | |
| EP | 0 473 068 | | 3/1992 | |
| EP | 0 480 522 | | 4/1992 | |
| EP | 0 608 771 | | 8/1994 | |
| EP | 0785099 A1 | * | 7/1997 | ............ B60J/7/057 |
| WO | WO 97/04985 | * | 2/1997 | ............ B60N/2/02 |
| WO | WO 97/22984 | * | 6/1997 | .......... H01H/19/00 |

OTHER PUBLICATIONS

International Search Report for PCT/US99/30847 dated Apr. 20, 2000.*

* cited by examiner

Primary Examiner—Gregory J. Toatley, Jr.
(74) Attorney, Agent, or Firm—Foley & Lardner (57) ABSTRACT

A window control system including at least one operator actuator and a housing, the operator actuator mounted and movable in the housing, and where the relative position of the operator actuator in the housing generates a position command signal to a window control circuit for moving the window in response to the position command.

21 Claims, 11 Drawing Sheets

FIG. 11 ns application claims priority under 35 U.S.C. § 119(e) from Provisional Application Ser. No. 60/113,623 filed on Dec. 23, 1998 by Northwehr and Wilkinson, and entitled WINDOW CONTROL APPARATUS.

WINDOW CONTROL APPARATUS

This present application claims priority under 35 U.S.C. § 119(e) from Provisional Application Ser. No. 60/113,623 filed on Dec. 23, 1998 by Northwehr and Wilkinson, and entitled WINDOW CONTROL APPARATUS.

BACKGROUND OF THE INVENTION

The present invention relates to a window control system for controlling the operation of the windows of a vehicle, and more particularly, to a window control circuit or system incorporating a control assembly having a plurality of operator actuators such as switches or dials and visual indicators. The operator actuators and visual indicators allow a driver or passenger of the vehicle to raise or lower the windows to a desired position by simply moving the appropriate switch(es) or dial(s) to the desired position.

Power window and mirror systems are widely used in motor vehicles such as cars and trucks to enable the driver or passenger in the vehicle to raise or lower one or more windows, and to allow the vehicle operator to quickly and easily adjust the outside driver and passenger side mirrors of the vehicle. Typically, such systems employ various mechanical switches, one associated with each of the driver/front, passenger/front, driver/rear and passenger/rear windows.

Traditionally, to raise or lower a window, a driver or passenger holds the switch associated with the desired direction of movement of the window (i.e., either up or down) in an engaged position until the window reaches the desired position. Obviously, this requires the driver to watch the window to visually discern when the window is at the desired position. If the driver is adjusting a rear window of the vehicle, the driver will be required to turn and look in the direction of the window being adjusted to know when it has reached the desired position. This visual adjustment adds a degree of inconvenience to the adjustment of the windows for the driver or front seat passenger.

A further problem that may be associated with power window switches and a self positioning window system is the plurality of controls for an individual window. For example, a rear window may have driver controls and rear passenger controls. Accordingly, the position of a slide switch along a positioning slot in a driver control assembly will not necessarily be indicative of the position of a rear window if a rear occupant moves the window with his/her control switches. Automated movement of the slide switch positions to assure conformity between the driver control assembly and rear occupant controls would necessitate increased cost and complexity of the system. Thus, there is a need in the art for visual indication and augmented controls to assure multiple control conformity and agreement in a self positioning window system.

Additional control switches are also provided on at least the driver's side door for conventional window control assemblies, enabling the driver and/or passenger to adjust the mirrors up, down, left, or right, as well as to select which mirror is to be adjusted. Other mechanical switches are also frequently employed such as window "lockout" switches, for example, which disable the window adjustment controls mounted on each door of the vehicle.

As can be appreciated, the significant number of mechanical switches and electrical wiring required for window and mirror control systems require a significant amount of the space to be used on and around the area of each vehicle door. The electrical wiring typically employed is also not very flexible, thus requiring that the switches be mounted fixedly to the door so that repeated flexing of the wires does not occur that could potentially result in an open or short circuit for one or more of the switches.

It is therefore a principal object of the present invention to provide a window switch or dial assembly having a visual indicator which allows a vehicle occupant to precisely position a vehicle window at a desired position simply by sliding a switch or rotating a dial to a desired position. The visual indicator provides easily viewed window position feedback, thereby eliminating the need for the driver or passenger to physically watch the movement of the window to know when it reaches the desired position. Accordingly, the visual indicator provides window position feedback independent of switch or dial position to allow conformity and agreement between multiple control switches or dials controlling the position of a single window.

It is a further object to provide a compact window switch or dial assembly and associated control circuit that eliminates the need for bulky, mechanical control assemblies to be mounted in the interior door panels of the vehicle, thus enabling the window control assembly to be mounted in areas of an interior door panel where conventional control assemblies could not be easily mounted for lack of sufficient space.

It is still another object of the present invention to provide a window control assembly which incorporates a flexible circuit board that allows the entire circuit board to be mounted such that it can be moved by a driver or occupant to gain access to an associated storage compartment, where the storage compartment.

It is also an object to provide a window switch or dial assembly having a flexible circuit board which enables the assembly to be mounted flush with a contoured portion of an interior door panel.

SUMMARY OF THE INVENTION

The present invention relates to a window actuator assembly, such as a switch or dial assembly, having visual indicators and associated control systems or circuits. The switch assembly incorporates a plurality of slide switches and a flexible circuit board, and the dial assembly incorporates a plurality of dials and a flexible circuit board. A plurality of position indicating light emitting diodes (LED's) may be included with both the switch and dial assemblies. The number of active or lit LED's may be used to indicate the degree to which a window has been opened by the switch or dial. The color of specific LED's may be used to indicate whether the window is locked or unlocked. In a preferred embodiment, the slide switches or dials are associated one with each of the driver/front, passenger/front, driver/rear and passenger/rear windows of a motor vehicle. The preferred embodiment of the present invention also includes a mirror selector switch and switch controls for enabling a driver to adjust the driver and passenger side exterior mirrors as needed.

The slide switches or dials permit the driver or an occupant to quickly and easily adjust a window to a desired position by simply sliding the switch or rotating the dial to a desired position. There is no need to hold the switch or keep the dial engaged and to look at the window to determine when the switch needs to be released or the dial no longer needs to be rotated, as with conventional window controls. Accordingly, if the driver wishes to lower one of the rear windows half way, the appropriate switch is simply slid to the approximate halfway location in a slot and a pushbutton located in said switch is actuated to trigger a position command to the window position control system such that the position command may be executed. In a window control assembly equipped with dials, the dials need only be rotated to a desired position to change the position of the window. A visual indicator is included with the slide switch assembly and/or dial assembly to provide window position feedback independent of switch and dial position. The visual indicators allow the use of multiple control switches or dials for a single window by eliminating the need to view the position of the slide switch or the rotation of the dial to determine the window position.

The flexible circuit board of the present invention eliminates the need for bulky, conventional mechanical switch assemblies and also enables the entire switch or dial assembly to be mounted for movement on the interior door panel. In this manner, the switch or dial assembly can be easily moved to permit a driver or occupant to gain access to a storage compartment formed behind or underneath the switch assembly. The flexibility provided by the flexible circuit board permits mounting of the circuit board in this fashion without worry that repeated flexing might eventually cause shorting or an open circuit condition to occur, which would be a concern with switch assemblies coupled directly to a plurality of electrical wires.

The flexible circuit board also enables mounting along a contoured arm portion of an interior door panel such that the window switch or dial assembly blends in with the contour of the arm portion. Since the assemblies of the present invention are significantly more compact than previously developed window switch assemblies, it can also be mounted on areas of an interior door panel where conventional switch assemblies could not be mounted for lack of space.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENTS

Figure 1:
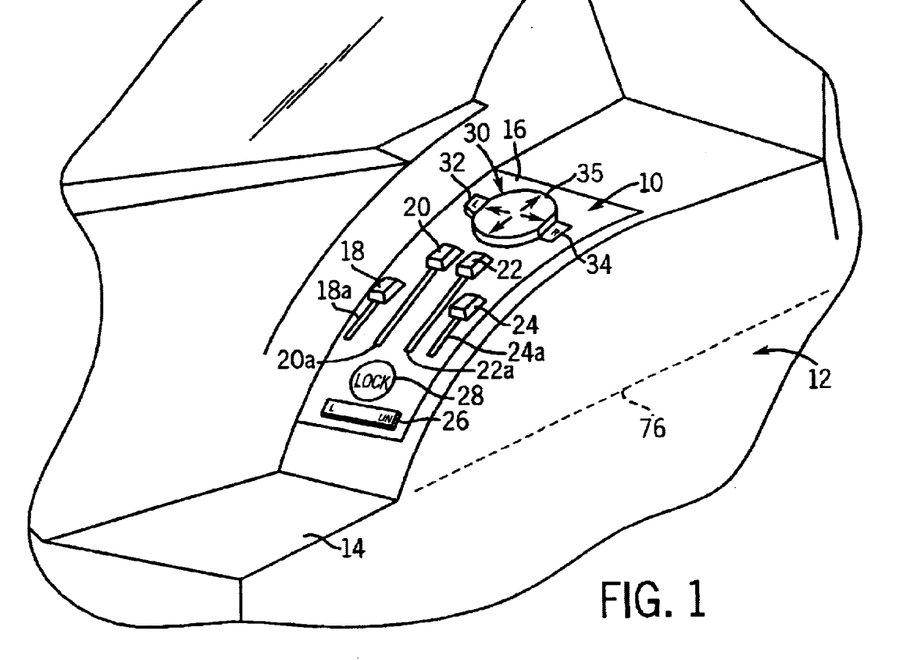
FIG. 1 is a perspective view of a portion of an interior door panel of a vehicle illustrating a first embodiment of a switch control assembly of the present invention.

Referring to FIG. 1, a window switch control assembly 10 in accordance with a first embodiment of the present invention is shown. The switch assembly 10 is shown mounted in an interior door panel 12 of a motor vehicle interior closely adjacent an arm rest portion 14 of the door panel 12. The switch control assembly 10 includes a molded plastic housing 16 having a contour which blends in with the surface of the door panel 12. Four window slide switches 18, 20, 22 and 24 control the driver/rear, driver/front, passenger/front and passenger/rear windows, respectively. Four corresponding slots 18a, 20a, 22a and 24a allow the slide switches 18, 20, 22 and 24, respectively, to be moved linearly along the housing 16. A rocker switch 26 controls the door locks such that all of the door locks of the vehicle can be opened or closed simultaneously. A window lockout switch 28 disables the window slide switches 18–24 of each switch assembly 10 mounted on each of the doors of the vehicle.

Also included on the switch control assembly 10 is a mirror control switch 30. The mirror control switch 30 includes a switch 32 for enabling the driver's side mirror to be adjusted and a switch 34 for enabling the passenger's side mirror to be adjusted. Once the switch 32 is actuated, the switch control assembly 10 enables the driver's side mirror to be adjusted by a four position switch 35 for a period of preferably about 30 seconds. Similarly, if the pushbutton 34 is pressed, then the passenger's side mirror can be adjusted using the four position switch 35 for a period of about 30 seconds. It will be appreciated, however, that a rocker style switch could also be used in connection with the four position switch 35 to continuously enable one or the other of the two front outer mirrors to be adjusted, depending upon which position the rocker switch is in.

The slide switches 18–24 form a principal feature of the switch control assembly 10 by allowing each window to be raised or lowered to a relatively precise position simply by moving the appropriate switch 18–24 to the desired point in slots 18a–24a and housing 16. For example, moving slide switch 18 to its approximate midpoint along slot 18a causes the window controlled by switch 18 to be moved approximately halfway down. Advantageously, the driver or occupant does not need to watch the window move down, and does not need to hold a switch depressed until the window is at the halfway point, as with previous window control switch arrangements. This adds significant convenience by eliminating the need for the driver to watch the window being controlled to determine when it is at the desired position. This feature is particularly advantageous when adjusting the rear windows of a vehicle. In this instance, with conventional window control switches which need to be held continuously to apply current to a window motor, the driver or occupant needs to turn and look behind to see when the window reaches the desired point of travel. This adds significant inconvenience to the driver. The switch control assembly 10, however, completely removes this inconvenience to the driver.

Figure 2:
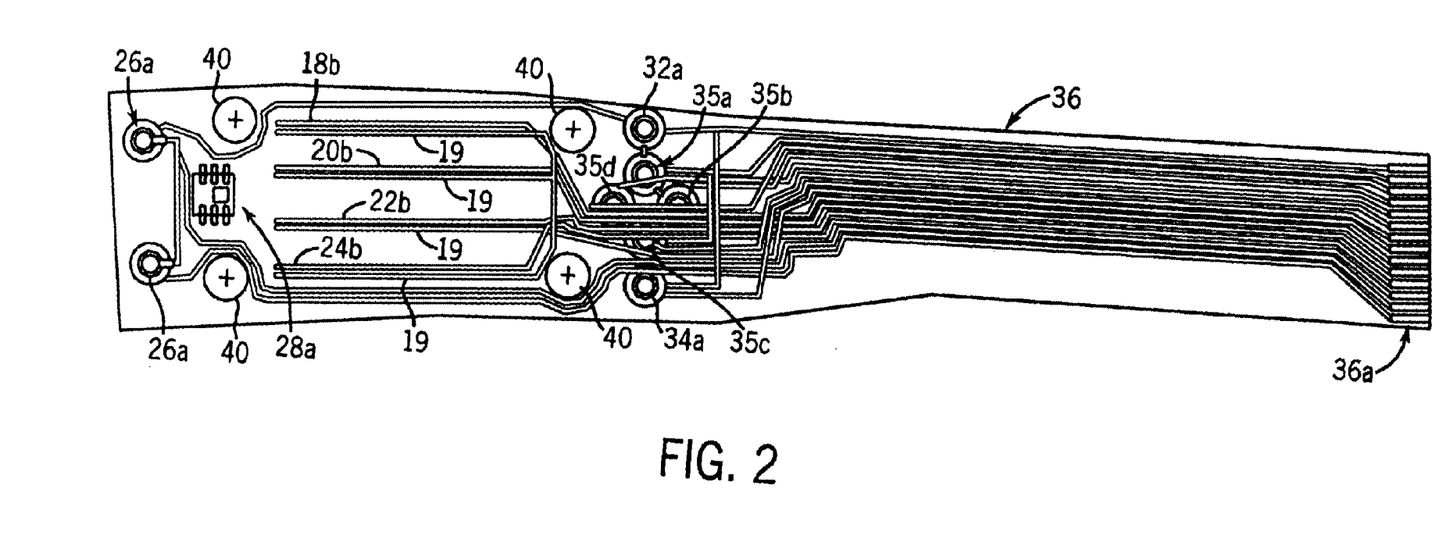
FIG. 2 is a plan view of the flexible circuit board used with the first embodiment of the switch control assembly of the present invention.

Referring now to FIG. 2, a flexible circuit board 36 is shown which forms part of the switch control assembly 10. The flexible circuit board 36 is attached to the housing 16 and communicates electrical signals to the door locks, window motors and mirror motors via the switches described in connection with FIG. 1. The circuit board 36 includes conductive traces at points 26a and 26b, which are associated with the rocker switch 26 (FIG. 1) used for locking and unlocking the door locks of the vehicle. Depressing the switch 26 on the "L" side of the switch 26 (FIG. 1) causes the switch to complete a circuit at point 26a. Conversely, pressing the switch 26 on the "UN" side causes a circuit to be completed at point 26b. Point 28a is associated with the window lockout switch and communicates an electrical signal when switch 28 is engaged to disable operation of all the window motors.

Resistors or potentiometers 18*b,* 20*b,* 22*b* and 24*b* are associated with slide switches 18–24, respectively, and are each disposed along an associated conductor 19 which is tied to ground. In this regard, it will be appreciated that each switch 18–24 includes a conductor which slides along and bridges its associated resistor 18*b*–24*b* and its associated ground conductor 19 to generate an analog voltage signal representative of the switch position. In alternate embodiments of the present invention, linear encoders (incremental or absolute) or other similar position feedback devices may be used in place of the potentiometers 18*b*–24*b.*

The conductors at points 35*a,* 35*b,* 35*c* and 35*d* are associated with the "LEFT", "UP" "RIGHT" and "DOWN" arrows on the four position switch 35. The conductors at point 32*a* are associated with the "LEFT" mirror control switch 32 and the conductors at point 34*a* are associated with the "RIGHT" mirror control switch 34. Holes formed at points 40 allow the flexible circuit board 36 to be coupled to bosses (not shown) on an undersurface of the housing 16. Since it is flexible, the circuit board 36 can readily assume the contour of the housing 16, thereby enabling it to be placed on contoured surfaces of the interior door panel 12. Edge 36*a* is coupled to a cable leading to a control circuit which processes the signals generated by the various above-described switches and controls the windows, mirrors and locks of the vehicle.

Figure 3A:
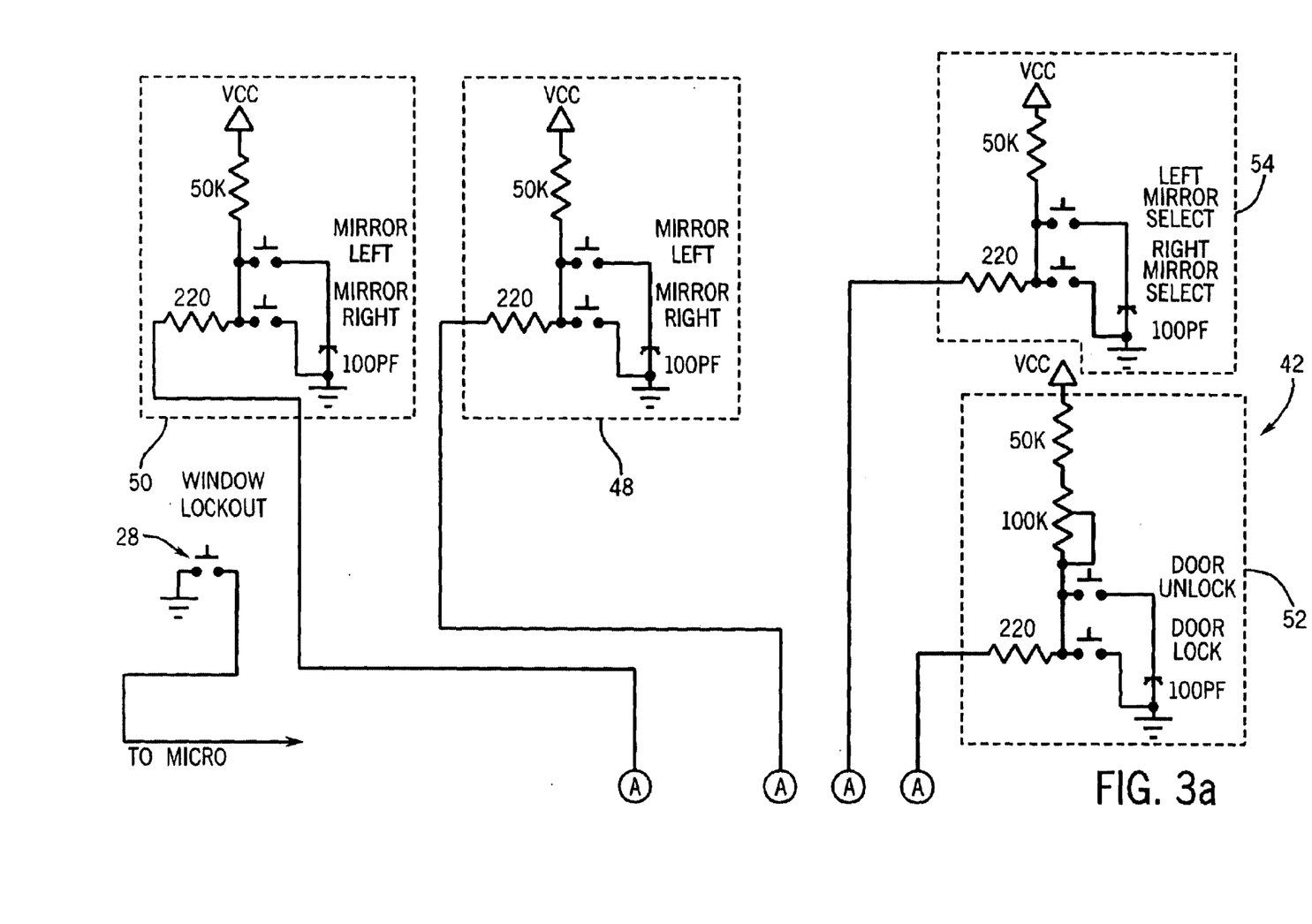
FIGS. 3a, 3b, 3c, 4, and 5 are schematic drawings of the electronic circuitry of the first embodiment of the switch control assembly of the present invention.
Figure 3B:
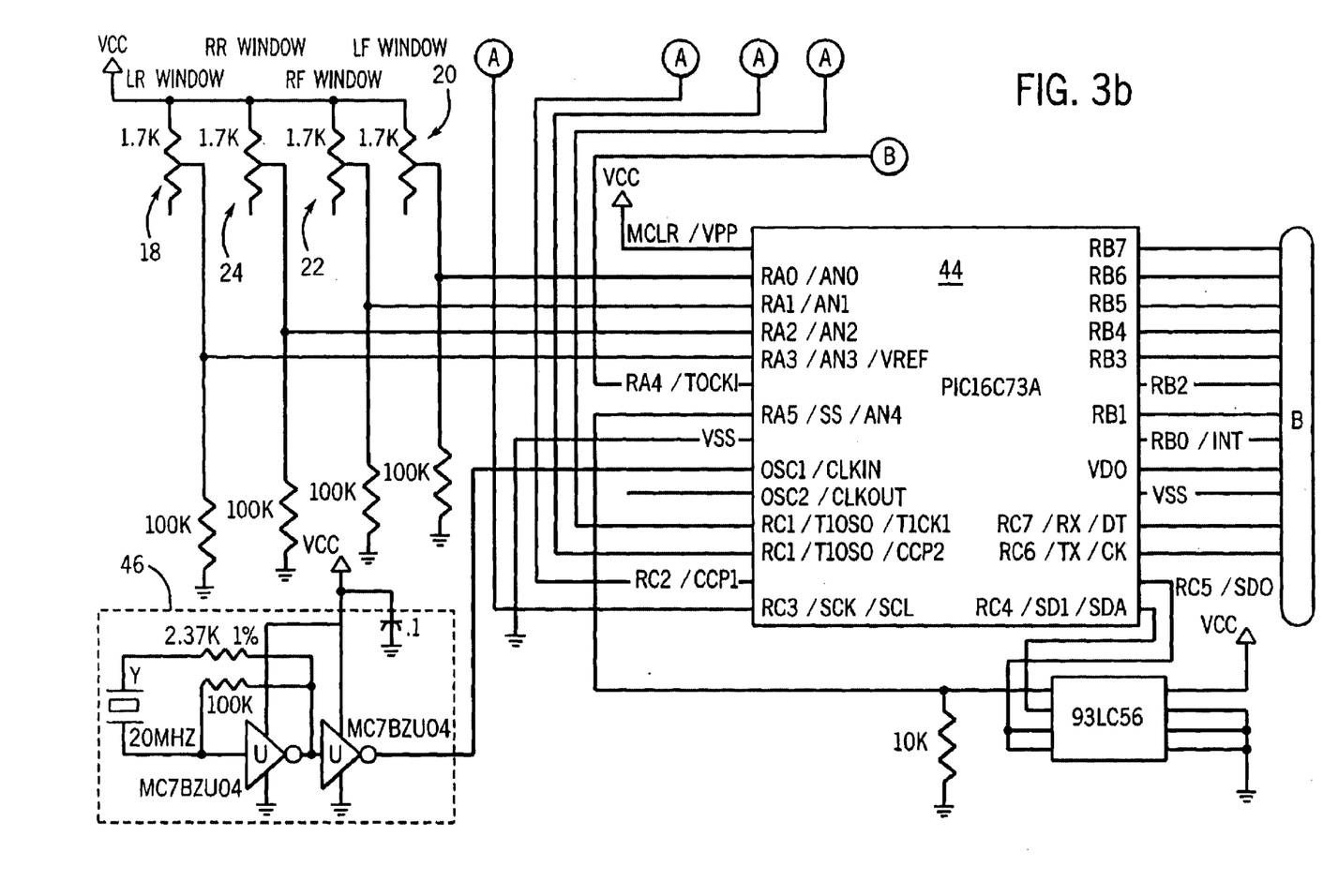
Figure 3C:
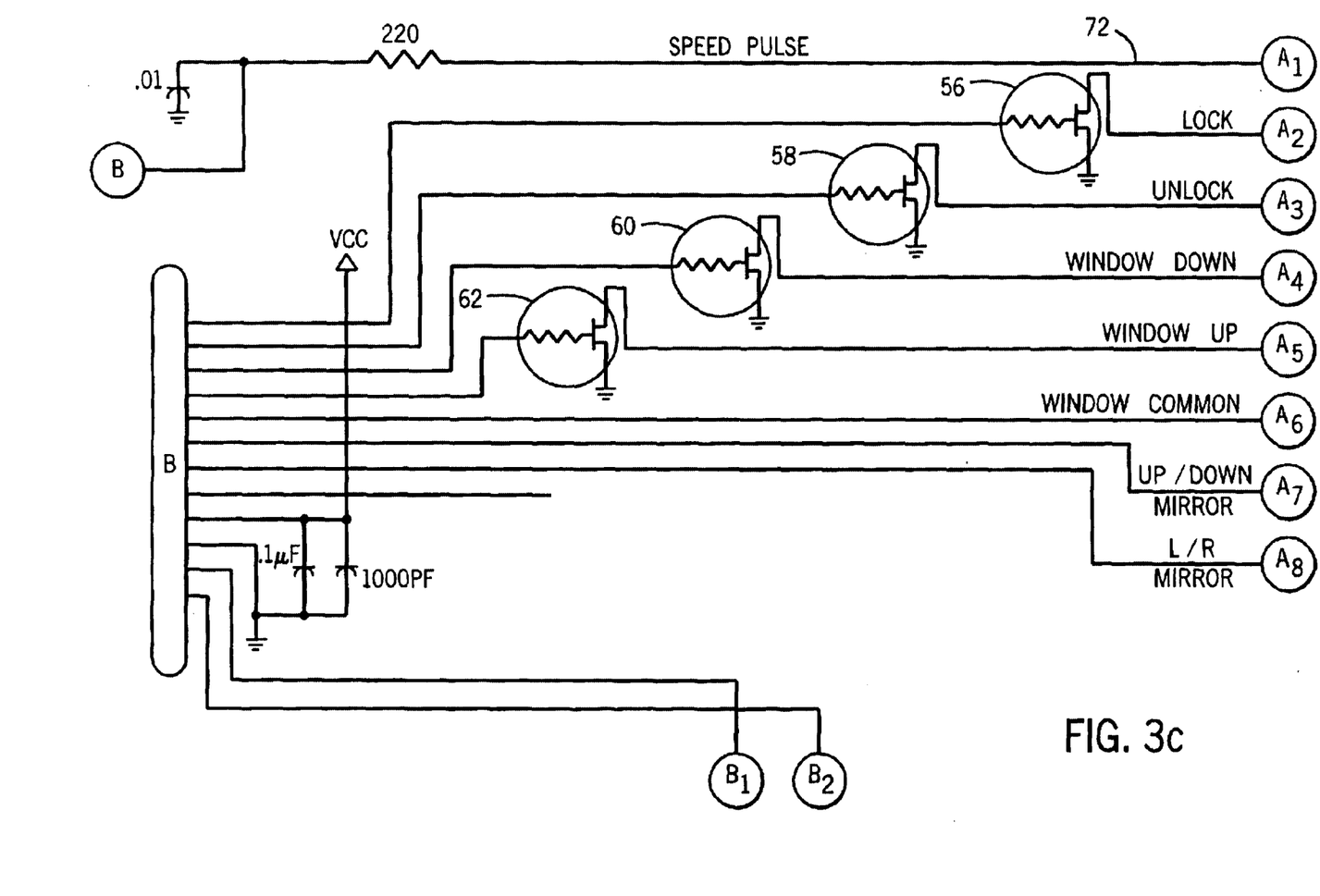
Figure 4:
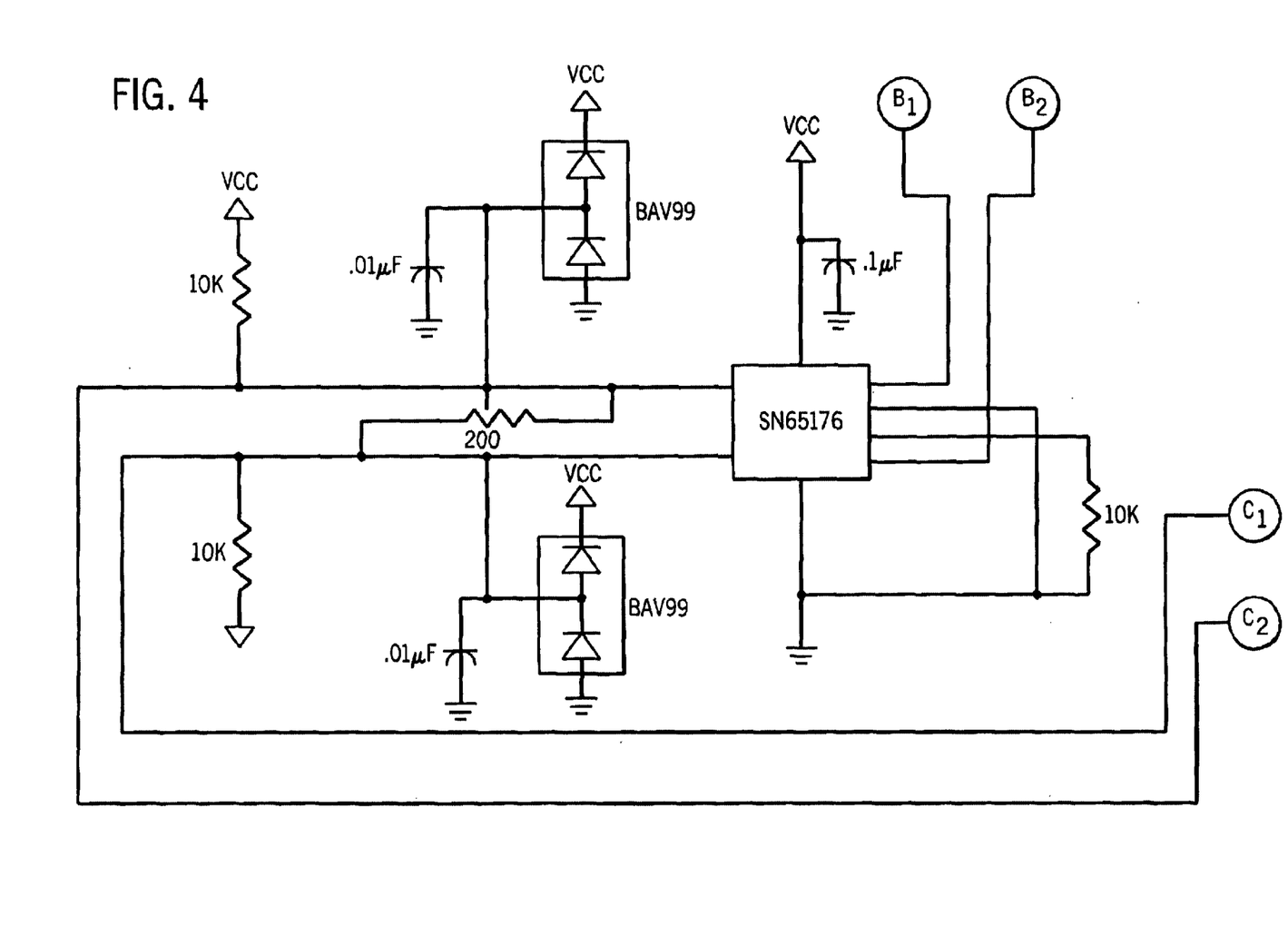
Figure 5:
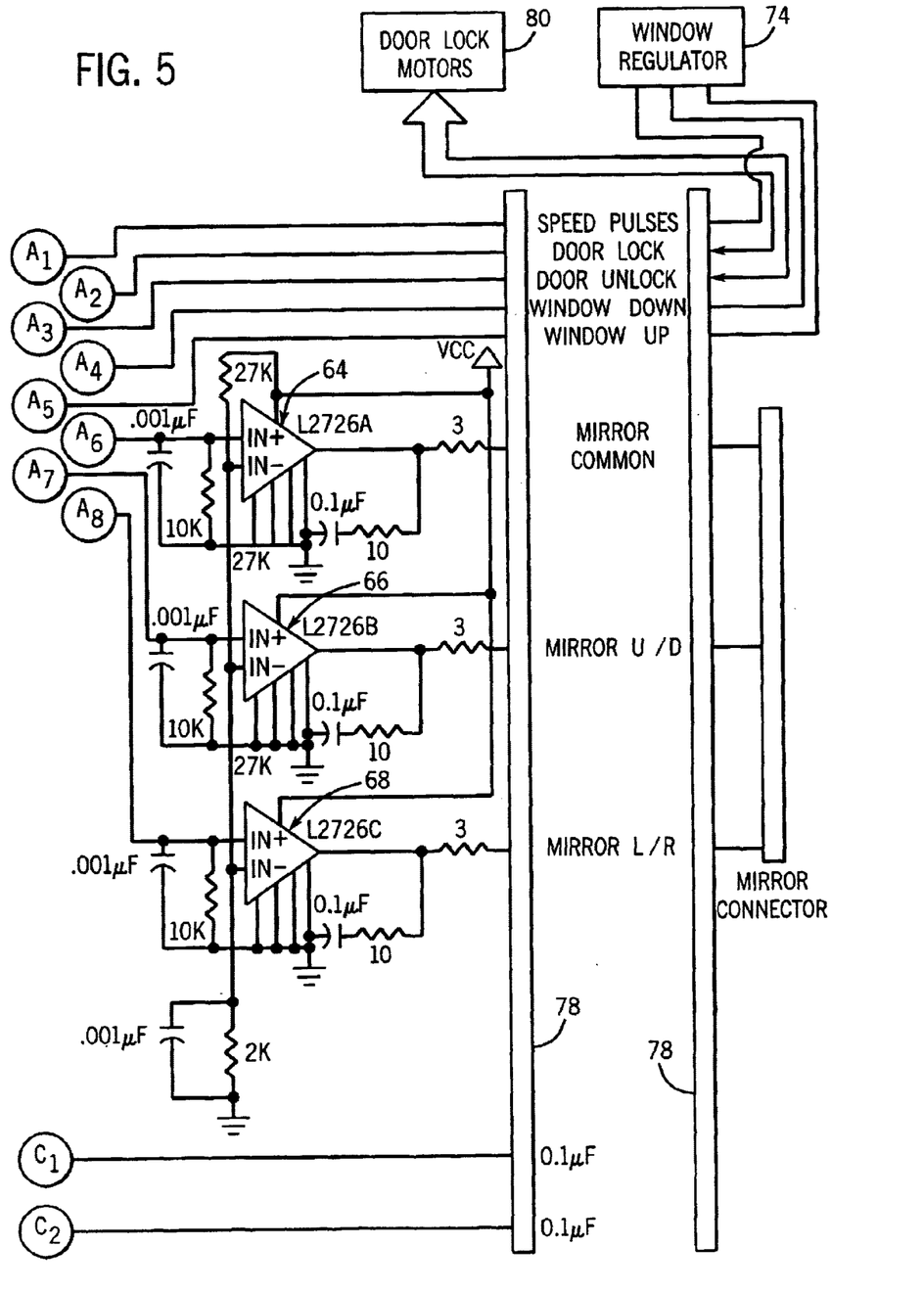

Referring now to FIGS. 3–5, an electrical control circuit 42 associated with the switch assembly 10 is disclosed. It will be appreciated that the various integrated circuits, resistors, capacitors and other components are disposed on a circuit board of a remote module that is coupled to the flexible circuit board 36 at edge 36*a* thereof and that variations of the control circuit may be used with the second embodiment of the switch control assembly 110 and the dial control assembly 180.

With initial reference to FIG. 3*b,* the control circuit 42 includes a microprocessor 44 that receives analog voltage signals, or position commands from slide switches 18–24. In alternate embodiments digital encoder signals may also be used. A clock signal from clock circuit 46 supplies the clock signal to the microprocessor 44 for the timing and execution of software embedded in the microprocessor 44. Additional discrete inputs of the microprocessor 44 receive signals from momentary UP and DOWN switches of the four position mirror switch 35, which form switch circuit 48 in FIG. 3*a,* as well as signals from the LEFT and RIGHT switches of the four position switch 35, which form switch circuit 50. The door LOCK and UNLOCK rocker switch 26 is represented by lock circuit 52 and the LEFT and RIGHT mirror select switches 32 and 34, respectively, are represented by switch circuit 54.

With further reference to FIG. 3*c,* a plurality of transistors 56, 58, 60 and 62 each have their bases tied, via a resistor, to outputs of the microprocessor 44. The transistors 56–62 are associated with "DOOR LOCK", "DOOR UNLOCK", "WINDOW UP", and "WINDOW DOWN" electrical motors. Turning on one of the microprocessor outputs coupled to any of these transistors causes the transistor to be forward biased or alternatively, pulsed on and off, thereby allowing current to flow through the transistor. Controls for a single door window are shown in FIGS. 3–5 and these controls may be replicated to drive similar electrical motors for additional door windows in a vehicle.

Referring to FIG. 5, the microprocessor 44 also has three outputs thereof coupled to op amps 64, 66 and 68. Op amp 64 is associated with a "mirror common" line, which is a common ground line tied to each of the UP/DOWN and LEFT/RIGHT motors for adjusting the exterior mirrors of the vehicle. Op amp 66 is associated with the mirror UP/DOWN motor and op amp 68 is associated with the LEFT/RIGHT motor (not shown) of the mirror. A connector 78 enables a window regulator circuit 74 and the door lock motors 80 to communicate with the microprocessor 44. With brief reference to FIG. 4, an interface circuit 70 provides appropriate level shifting of signals received from the window controls and window motors such that the microprocessor 44 can monitor operation of these motors.

In the preferred embodiment the motors used to move the windows are permanent magnet dc motors and a voltage is applied to the armature of the dc motors in the window regulator circuit 74. In alternate embodiments, pulsed current is applied to stepper motors in the window regulator circuit 74 to cause rotation of the stepper motor and positioning of the windows. Additional electrical motors such as induction motors and dc brushless motors are considered within the scope of the present invention.

With further reference to FIGS. 3*a*–3*c* and 5, circuit line 72 enables pulses received from the window regulator 74 to be counted by the microprocessor 44 in order for the position of the window being adjusted to be tracked. In this regard, it will be appreciated that the output shaft of each window motor preferably includes a Hall effect sensing arrangement in which rotation of the output shaft generates a series of pulses. In alternate embodiments a proximity switch or optical encoder may also be used. In the case of a stepper motor being used as the window motor, these pulses in combination with a pulsed position command for the stepper motor ensures redundant feedback for the position of the window. If the window is lowered completely, the total number of pulses generated by the pulsed sensor can be divided as needed by the microprocessor so that the microprocessor 44 can determine when the window is lowered halfway, one quarter down, etc. In this manner the microprocessor 44 can readily keep track of the position of each window.

Figures 6, 7:
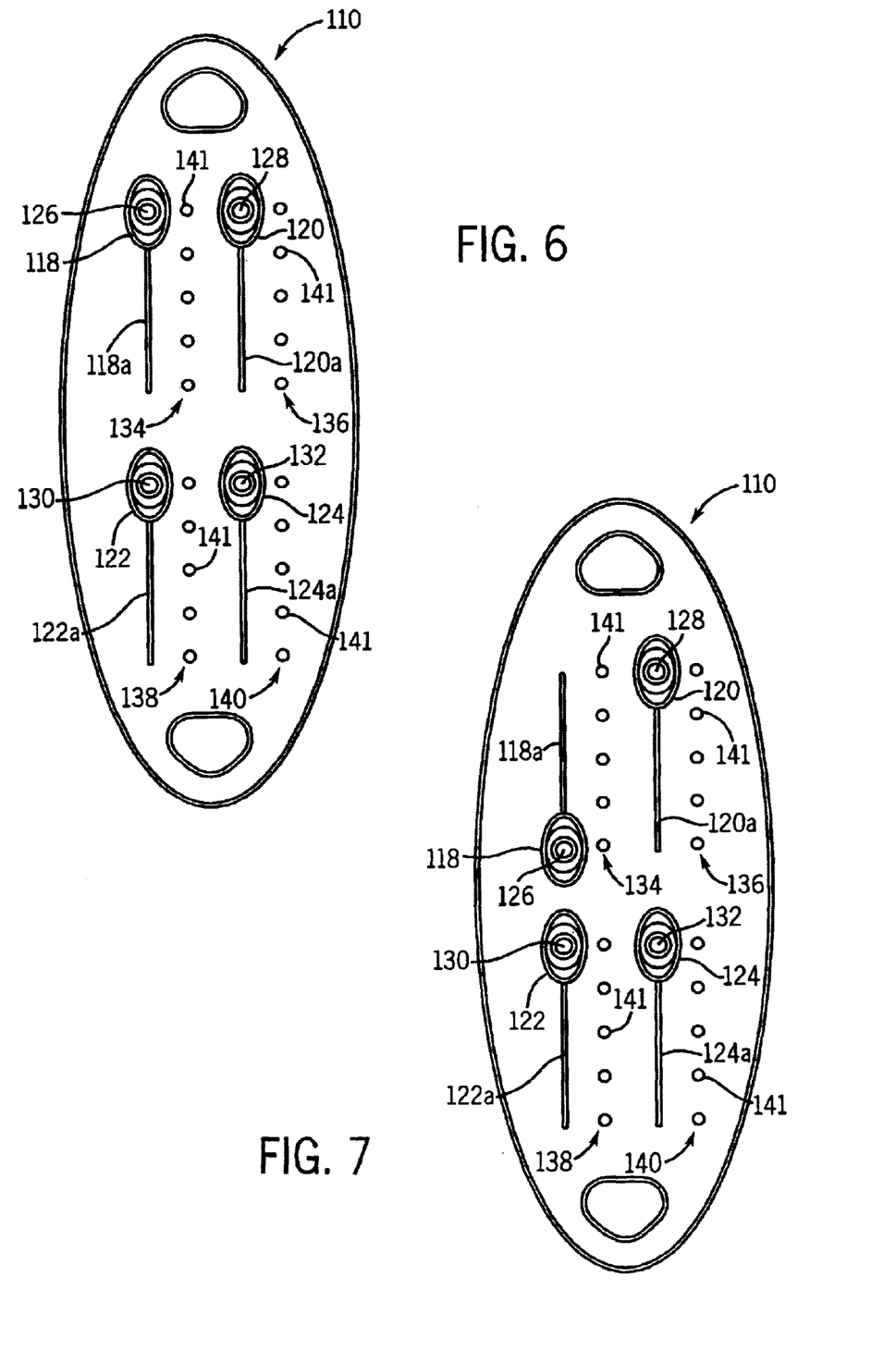
FIGS. 6 and 7 are plan views of a switch control assembly according to a second embodiment of the present invention.

FIGS. 6 and 7 are plan views of a switch control assembly 110 according to a second embodiment of the present invention. As in the first embodiment of the switch control assembly 10, the slide switches 118, 120, 122, and 124, having pushbuttons 126, 128, 130, and 132, allow each window to be raised or lowered to a relatively precise position simply by moving the appropriate slide switch 118–124 to the desired point in slots 118*a,* 120*a,* 122*a,* and 124*a* and then actuating the pushbuttons 126–132. The pushbuttons 126–132 are used to complete an electrical circuit and provide the trigger for an associated control circuit to receive the position command from the slide switches 118–124. As in the first embodiment, the slide switches 118–124 provide an analog voltage position command signal proportional to the contact of the slide switch position on the potentiometers and interpreted by a window control circuit similar to the circuit used in the first embodiment. The control circuit will not act upon the position command from the slide switches 118–124 until triggered by the pushbutton 126–132. Position feedback in this second embodiment of the switch control assembly 110 is no longer provided by slide switch position, but rather by LED banks 134, 136, 138, and 140.

The LED banks 134–140 provide direct feedback for the position of each door window in a vehicle within the forward visual perspective of a driver or passenger. In the preferred embodiment, each LED bank 134–140 includes five LED's having a lit or unlit state corresponding to generally a closed position, a ⅕ open, a ⅖ open, a ⅗ open, a ⅘ open, and completely open position for the door window, although any number of LED's is considered within the scope of this invention. The LED banks include dual color LED's 141 that emit either a green or red light, with green indicating position information and red indicating a locked state for the door window. An additional window lock switch may be included to lock all the door windows in position. The position indicating functions of the LED banks 134–140 allow the slide switches 118–124 to be used only to generate position commands without providing position feedback. In this manner, multiple controls in the front and rear of a vehicle may be used to control a single window without confusion, as position feedback for a vehicle occupant is not dependent on the position of the slide switches 118–124, but rather on the lit or unlit states of the LED banks 136–140 proximate each vehicle occupant. As in the first embodiment 10 of the present invention, the driver or passenger does not need to watch the window move up or down, and does not need to hold a switch depressed until the window is at a desired position, as with previous window control switch arrangements.

Figure 8:
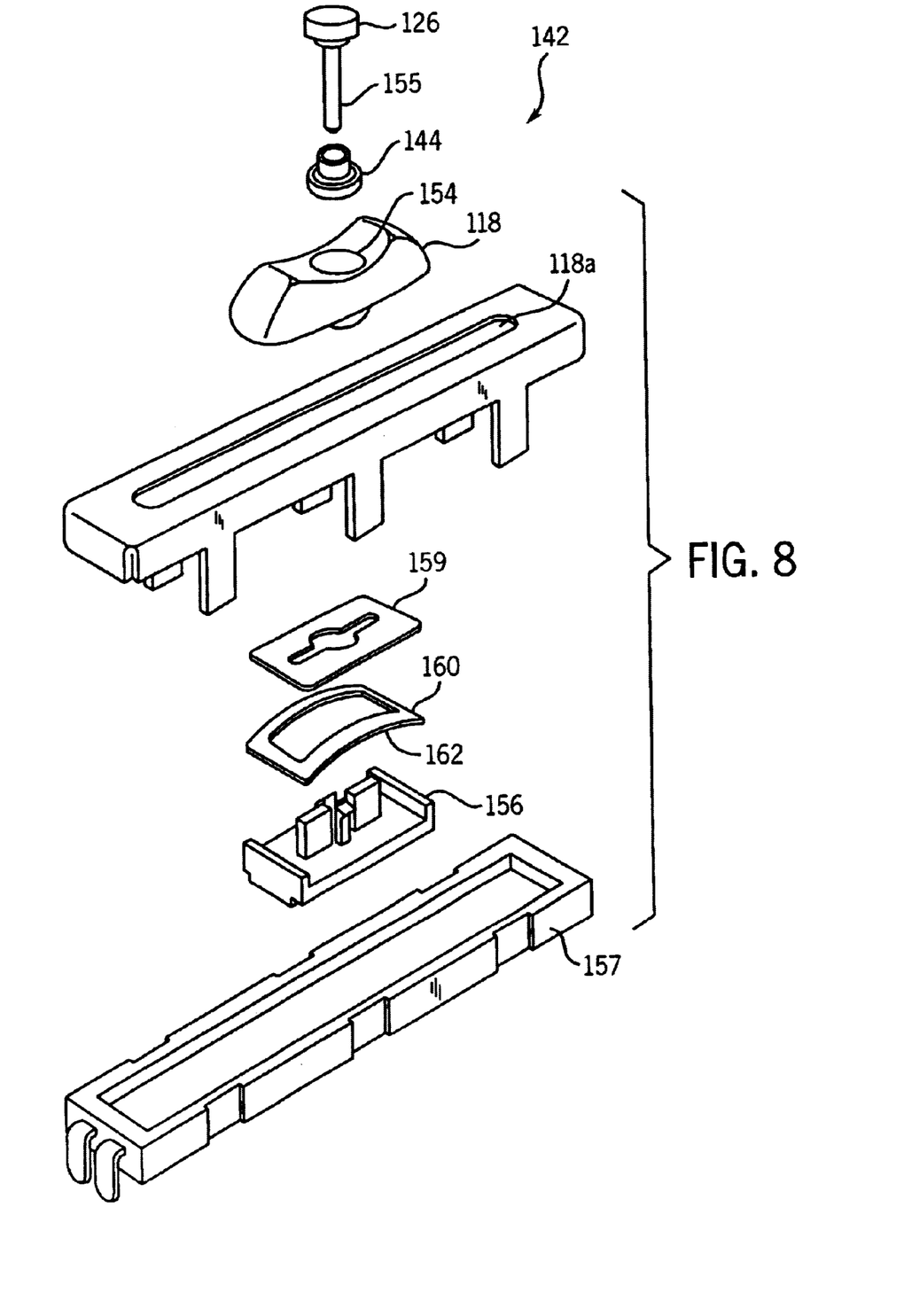
FIG. 8 is an exploded perspective view of a switch module of the switch control assembly shown in FIGS. 6 and 7.
Figure 9:
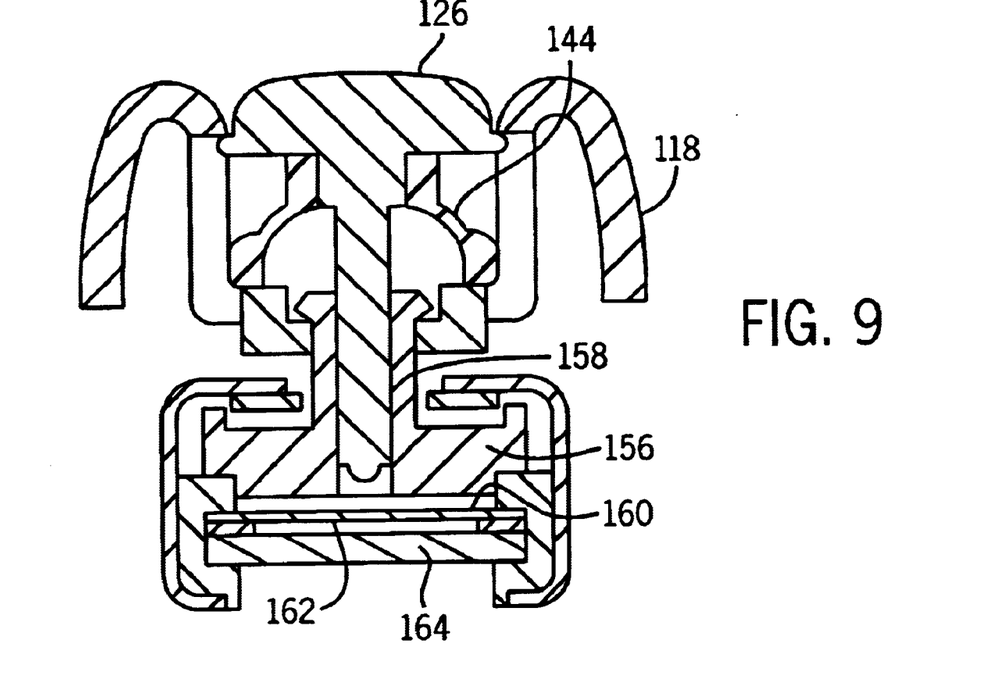
FIGS. 9 and 10 are cross-sectional views of the switch module shown in FIG. 8.
Figure 10:
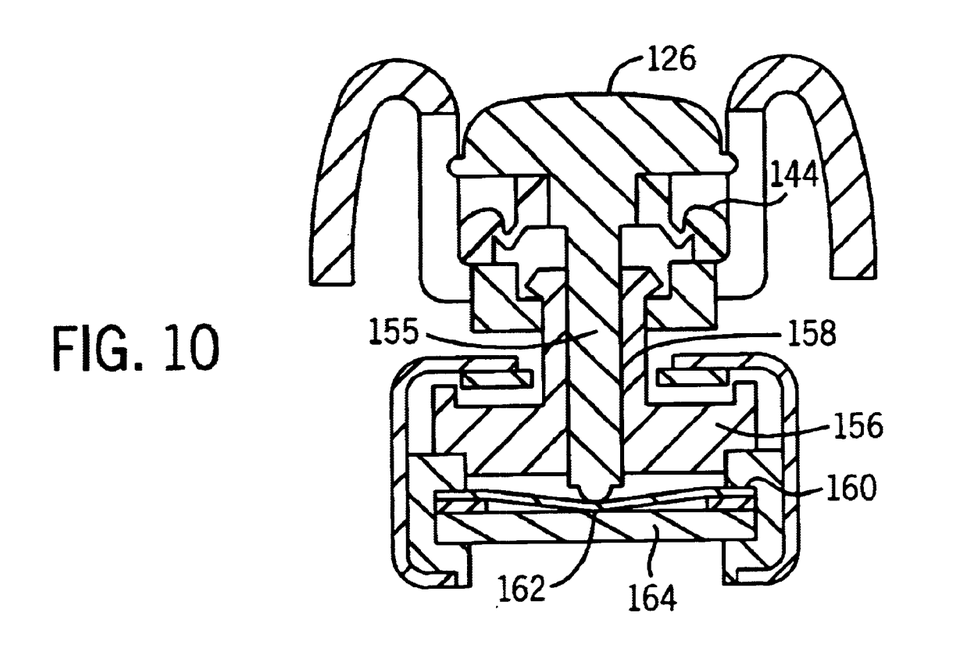

FIG. 8 is an exploded view of slide switch module 142 used in the switch control assembly 110 and FIGS. 9 and 10 are cross-sectional diagrams of the slide switch module 142 used in the switch control assembly 110. The slide switch module 142 includes the previously discussed slide switch 118 (alternatively, slide switches 120, 122, and 124) and pushbutton 126 (alternatively, pushbuttons 128, 130, and 132) and slot 118a (alternatively, slots 120a, 122a, and 124a). As seen in FIG. 8, the push button 126 is coupled by a flexible collar 144 in an aperture 154 formed in the slide switch 118. The flexible collar 144 provides a spring-like resistance for returning the pushbutton 126 to its original position after it has been pushed. The push button 126 further includes a post 155 that is fitted to a support member 156 via a channel 158 for the pushbutton 126. A housing 157 is used to mount the switch module 142 in the switch control assembly 110. The channel 158 and a grommet 159 guides and directs the pushbutton 126 as the pushbutton post 155 travels up and down the channel 158 in response to being actuated or pushed by a driver or passenger. A conductive flexible membranes 160 having a conductive portion 162 on its underside is normally spaced apart from a potentiometer 164.

Referring to FIG. 10, the conductive portions 162 of the membrane 160 will make electrical contact upon the movement of the pushbutton post 155 forcing the conductive portions 162 into contact with the potentiometer 164. This contact will generate a trigger to the vehicle control system to execute a window position command based on the position of the slide switch 118 and its associated electrical signal within the slot 118a.

The switch assemblies 10 and 110, being very compact, can easily be mounted such that they can be manually lifted to expose an associated auxiliary storage compartment formed in the interior door panel of the vehicle. Such a storage compartment is represented in phantom by line 76 in FIG. 1. There are no electrical wires or bulky mechanical switch assemblies associated with the switch assemblies 10 and 110, which enables them to be placed in areas on the door panel 12 where conventional window switch control assemblies could not be placed. The switch control assemblies 10 and 110 thereby form a low current control system for remotely controlling the various motors associated with the windows, door locks and mirrors of a vehicle.

It will also be appreciated that, while the switch control assemblies 10 and 110 have been shown as comprising four slide switches 18–24 and 118–124, the switch assemblies 10 and 110 could be readily modified to provide for a greater or fewer plurality of window control slide switches.

Figure 11:
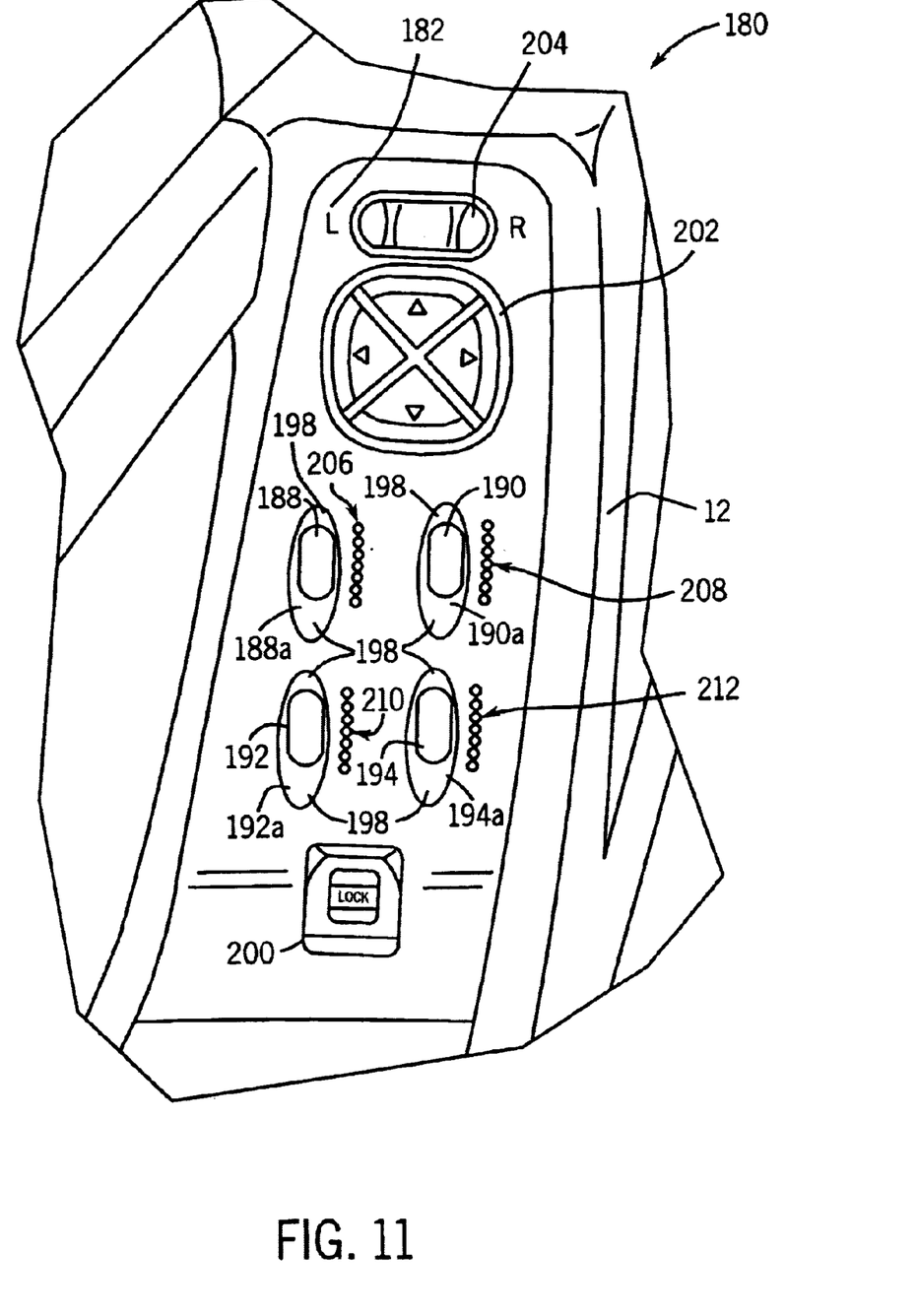
FIG. 11 is a perspective view of a portion of an interior door panel of a vehicle illustrating a dial control assembly of the present invention.

FIG. 11 is a perspective view of a portion of an interior door panel of a vehicle illustrating the dial control assembly 180 of the present invention. The dial assembly 180 includes a molded plastic housing 182 having a contour which blends in with the surface of the door panel 12. Four window dials 188, 180, 192, and 194 control the driver/rear, driver/front, passenger/front and passenger/rear windows, respectively. Four corresponding slots 188a, 190a, 192a, and 194a allow the dials 188–194 to be rotated within the housing 196. Each slot 188a–192a includes indentations 198 formed in the housing on the tops and bottoms of the dials 188–194 to allow easy access to the rotation of the dials 188–194 by an operator. The dials 188–192 may include a rotational potentiometer with a wiper assembly to generate an analog position signal command or in an alternate embodiment, an optical encoder (incremental or absolute) may be used to provide a digital position command signal. As the dials 188–194 are rotated, a position command signal will be generated and transmitted to a window control circuit, similar to the circuit shown in FIGS. 3–5, to actuate the window motors.

The dials 188–194 also serve the dual function of a window lock/unlock pushbutton. Each dial 188–194 is not only rotatable but also may be depressed as a pushbutton. The depressing of each dial 188–194 will serve to lock out the specific door window to which the particular dials 188–194 are associated. Accordingly there is no need for an additional window lock/unlock pushbutton and each door window may be locked individually, where in the past only one window lock button was included and all the windows were locked or unlocked with the single window lock button. As in the second embodiment 110 of the present invention, LED banks 206, 208, 210 and 212 provide position feedback for each window and operate in a similar manner.

Also included on the dial assembly 180 is a mirror control switch 202. The mirror control switch 202 includes a rocker switch 204 for enabling the driver's side mirror to be adjusted or the passenger's side mirror to be adjusted.

It is to be understood that the invention is not limited to the exact construction illustrated and described above, but that various changes and modifications may be made without departing from the spirit and scope of the invention.

We claim:

1. A window control system for an automotive vehicle, the system comprising:

an operator actuator movable between a plurality of positions, wherein each position corresponds to a distinct position of a window;

an operator trigger mechanism movable between an actuated state and an unactuated state;

a control circuit coupled to the operator actuator and configured to generate a control signal based upon a position of the operator actuator;

a window actuator configured to move a window based upon the control signal in response to the trigger mechanism changing from the unactuated state to the actuated state; and a visual indicator includes at least three indications corresponding to at least three positions of the window wherein the at least three indications includes at least three light emitters and wherein the light emitters emit a first colored light when the window is in a locked state and a second colored light when the window is an unlocked state.

2. The system of claim 1 including a housing, wherein the operator actuator includes a slide switch movable within a slot formed in the housing.

3. The system of claim 2, wherein the trigger mechanism includes a push button.

4. The system of claim 3, wherein the push button is carried by the slide switch.

5. The system of claim 1, wherein the trigger mechanism is coupled to the operator actuator.

6. The system of claim 5, wherein the trigger mechanism is carried by the operator actuator.

7. The system of claim 1, wherein the operator actuator includes a rotatable dial.

8. The system of claim 1, wherein the operator actuator is movable to a position not corresponding to the visual indicator's indication of the position of the window.

9. The system of claim 8, wherein the operator actuator and the visual indicator's indication of the position of the window correspond to one another after the trigger mechanism is in the actuated state.

10. The system of claim 1, wherein the at least three light emitters includes at least three light emitting diodes.

11. The system of claim 1, wherein the control circuit includes a flexible circuit board.

12. The system of claim 11 including a housing having a first stationary portion forming a storage compartment and a second portion movable relative to the first stationary portion to cover and operate the storage compartment, wherein the flexible circuit board is coupled to the second moveable portion so as to move with the second movable portion.

13. The system of claim 11 including a door having a contoured surface, wherein the flexible surface is coupled to the door along the contoured surface.

14. The system of claim 13, wherein the contoured surface is formed as part of a contoured arm of the door.

15. A panel control system for an automotive vehicle, the system comprising:
an operator actuator movable between a plurality of positions, wherein each position corresponds to a distinct position of a panel;
a control circuit coupled to the operator actuator and configured to generate a control signal based upon a position of the operator actuator;
a panel actuator configured to move a panel based upon the control signal; and
a visual indicator indicating the position of the panel, wherein the indicator includes at least three indications which are independent of the position of the operator actuator and which correspond to at least three positions of the panel, wherein the at least three indications includes at least three light emitters and wherein the light emitters emit a first colored light when the window is in a locked state and a second colored light when the window is an unlocked state.

16. A window control system for an automotive vehicle, the system comprising:
an operator actuator;
a control circuit coupled to the operator actuator and configured to generate a control signal based upon a position of the operator actuator;
a window actuator configured to move a window based upon the control signal; and
a visual indicator configured to indicate a position of the window, wherein the visual indicator includes a light emitter configured to emit a first colored light when the window is in a locked state and a second colored light when the window is in an unlocked state.

17. A window control system for an automotive vehicle, the system comprising:
a door having an interior storage compartment having an opening;
a cover movable between a first position in which the cover covers the opening and a second position providing access to the storage compartment through the opening;
an operator actuator coupled to the cover;
a window actuator disposed within the door remotely from the operator actuator and configured to move a window; and
a control circuit including a flexible control circuit board coupled to the operator actuator and the cover and electrically coupled to the window actuator, wherein the control circuit is configured to generate a control signal based upon a position of the operator actuator and wherein the window actuator moves the window based upon the control signal.

18. A window control system for an automotive vehicle, the system comprising:
an operator actuator;
a control circuit coupled to the operator actuator and configured to generate at least one control signal based upon a position of the operator actuator; and
a window actuator configured to move a window based upon the control signal, wherein the operator actuator is movable in a first manner to adjust a position of the window and movable in a second manner to actuate the window between a locked state and an unlocked state.

19. The window control system for an automotive vehicle, the system comprising:
a first operator actuator;
a second operator actuator;
at least one control circuit coupled to the first operator actuator and the second operator actuator, wherein the at least one control circuit is configured to generate a first control signal based upon a position of the first operator actuator and a second control signal based upon a position of the second operator actuator;
a window actuator configured to move a window based upon either the first control signal or the second control signal; and
a visual indicator configured to indicate a position of the window when the window position corresponds to the position of the second operator actuator while the position of the window does not correspond to the position of the first operator actuator, wherein the visual indicator includes a light emitter configured to emit a first colored light when the window is in a locked state and a second colored light when the window is in an unlocked state.

20. The system of claim 19, wherein the visual indicator is proximate the first operator actuator.

21. The system of claim 20 including a first operator trigger mechanism associated with the first operator actuator, wherein the first operator trigger mechanism is actuatable between an actuated state and an unactuated state and wherein the window actuator is configured to move the window based upon the first control signal in response to the first operator trigger mechanism being in the actuated state.

* * * * *

UNITED STATES PATENT AND TRADEMARK OFFICE
CERTIFICATE OF CORRECTION

PATENT NO.    : 6,657,316 B1
DATED         : December 2, 2003
INVENTOR(S)   : Nels R. Smith et al.

It is certified that error appears in the above-identified patent and that said Letters Patent is hereby corrected as shown below:

<u>Title page,</u>
Item [75], Inventors, please replace the inventor name "Ruskin J. Lhamon" should with -- Ruskin T. Lhamon --.

Signed and Sealed this

Twenty-seventh Day of July, 2004

JON W. DUDAS
*Acting Director of the United States Patent and Trademark Office*